(12) United States Patent
Geissler

(10) Patent No.: US 10,470,602 B2
(45) Date of Patent: Nov. 12, 2019

(54) PUMP COFFEE BREWER

(75) Inventor: Richard L. Geissler, Chippewa Falls, WI (US)

(73) Assignee: National Presto Industries, Inc., Eau Claire, WI (US)

(*) Notice: Subject to any disclaimer, the term of this patent is extended or adjusted under 35 U.S.C. 154(b) by 660 days.

(21) Appl. No.: 13/158,673

(22) Filed: Jun. 13, 2011

(65) Prior Publication Data

US 2012/0312173 A1    Dec. 13, 2012

(51) Int. Cl.
*A47J 31/44* (2006.01)
*A47J 31/02* (2006.01)

(52) U.S. Cl.
CPC .................... *A47J 31/02* (2013.01)

(58) Field of Classification Search
CPC .. A47J 31/24; A47J 31/02; A47J 31/32; A47J 31/34; A47J 31/46; A47J 31/36
USPC .......... 99/290, 289 R, 302 R, 299, 304, 306, 99/317, 322; 426/433
See application file for complete search history.

(56) References Cited

U.S. PATENT DOCUMENTS

| | | |
|---|---|---|
| D43,792 S | 4/1913 | Swan |
| D65,078 S | 7/1924 | Pressley |
| D91,797 S | 3/1934 | Barrett |
| D132,428 S | 5/1942 | Karstadt |
| D139,219 S | 10/1944 | Wolcott |
| D157,588 S | 3/1950 | Gunther |
| 2,846,939 A | 8/1958 | Ponsa |
| D191,590 S | 10/1961 | Schlumbohm |
| D196,807 S | 11/1963 | Carveth |
| 3,120,170 A * | 2/1964 | Garte ............... A47J 31/24 210/352 |
| D204,786 S | 5/1966 | Rawald |
| 4,158,329 A | 6/1979 | McKnight |
| 4,174,659 A | 11/1979 | Pugliese et al. |
| 4,211,156 A | 7/1980 | Zimmermann |
| 4,306,492 A | 12/1981 | Zimmermann |
| 4,446,158 A | 5/1984 | English et al. |
| 4,465,697 A * | 8/1984 | Brice et al. ............... 426/79 |
| 4,577,080 A | 3/1986 | Grossman |
| 4,756,915 A | 7/1988 | Dobry |

(Continued)

OTHER PUBLICATIONS

"How the Clover Coffee Maker Works," http://electronics.howstuffworks.com/gadgets/kitchen/clover-coffee-maker.htm/printable, printed Mar. 15, 2010, 8 pages.

(Continued)

*Primary Examiner* — Ibrahime A Abraham
*Assistant Examiner* — Biniam B Asmelash
(74) *Attorney, Agent, or Firm* — Patterson Thuente Pedersen, P.A.

(57) ABSTRACT

A pump coffee brewer and related methods of use for brewing individual servings of coffee. The pump coffee brewer can include a pump assembly, brew chamber assembly and filtration assembly, whereby user manipulation of the pump assembly directs heated water through ground coffee to form freshly brewed coffee. The pump coffee brewer can physically interface with a coffee mug for receiving the freshly brewed coffee while in some alternative embodiments, a discharge assembly can be incorporated for filling the coffee mug. The pump coffee brewer all provide a coffee consumer the ability to generate individual servings of freshly brewed coffee on demand.

10 Claims, 8 Drawing Sheets

(56) References Cited

U.S. PATENT DOCUMENTS

| | | |
|---|---|---|
| 4,759,275 A | 7/1988 | Lee |
| 4,806,369 A | 2/1989 | Thompson |
| 5,010,221 A | 4/1991 | Grossman et al. |
| 5,526,733 A | 6/1996 | Klawuhn et al. |
| 5,551,473 A * | 9/1996 | Lin .................... E03B 7/10 |
| | | 137/218 |
| 5,632,193 A * | 5/1997 | Shen .................. A47J 31/02 |
| | | 99/285 |
| 5,825,493 A | 10/1998 | Tien Lin |
| 5,862,739 A | 1/1999 | Lin |
| 5,880,441 A | 3/1999 | Hartman et al. |
| 5,887,511 A | 3/1999 | Cappellotto |
| 5,942,143 A | 8/1999 | Hartman et al. |
| 5,943,946 A | 8/1999 | Chen |
| 6,327,965 B1 | 12/2001 | Lin Tien |
| 6,561,080 B1 | 5/2003 | Feeney |
| 6,740,345 B2 | 5/2004 | Cal |
| 6,810,789 B2 * | 11/2004 | Chung .................. A47J 31/02 |
| | | 99/285 |
| 6,948,420 B2 | 9/2005 | Kirschner et al. |
| 7,032,507 B2 | 4/2006 | Cai |
| D557,977 S | 12/2007 | Neace et al. |
| 7,412,921 B2 | 8/2008 | Hu et al. |
| D606,805 S | 12/2009 | Neace et al. |
| D611,754 S | 3/2010 | Bodum |
| 7,673,555 B2 | 3/2010 | Nosler et al. |
| 8,316,944 B2 * | 11/2012 | Pringle .................. E21B 43/25 |
| | | 166/320 |
| 2006/0169150 A1 | 8/2006 | Voss et al. |
| 2006/0174769 A1 | 8/2006 | Favre et al. |
| 2009/0199721 A1 * | 8/2009 | Hausslein ............ A47J 31/02 |
| | | 99/302 R |
| 2009/0269229 A1 * | 10/2009 | Yeo ...................... B01L 3/021 |
| | | 417/480 |
| 2011/0215085 A1 * | 9/2011 | Garvey ............. A47J 27/21191 |
| | | 219/440 |
| 2012/0260806 A1 | 10/2012 | Rolfes et al. |
| 2014/0072684 A1 | 3/2014 | Madden |

OTHER PUBLICATIONS

Application and File history for U.S. Appl. No. 13/711,245, filed Dec. 11, 2012. Inventors: Geissler et al.

* cited by examiner

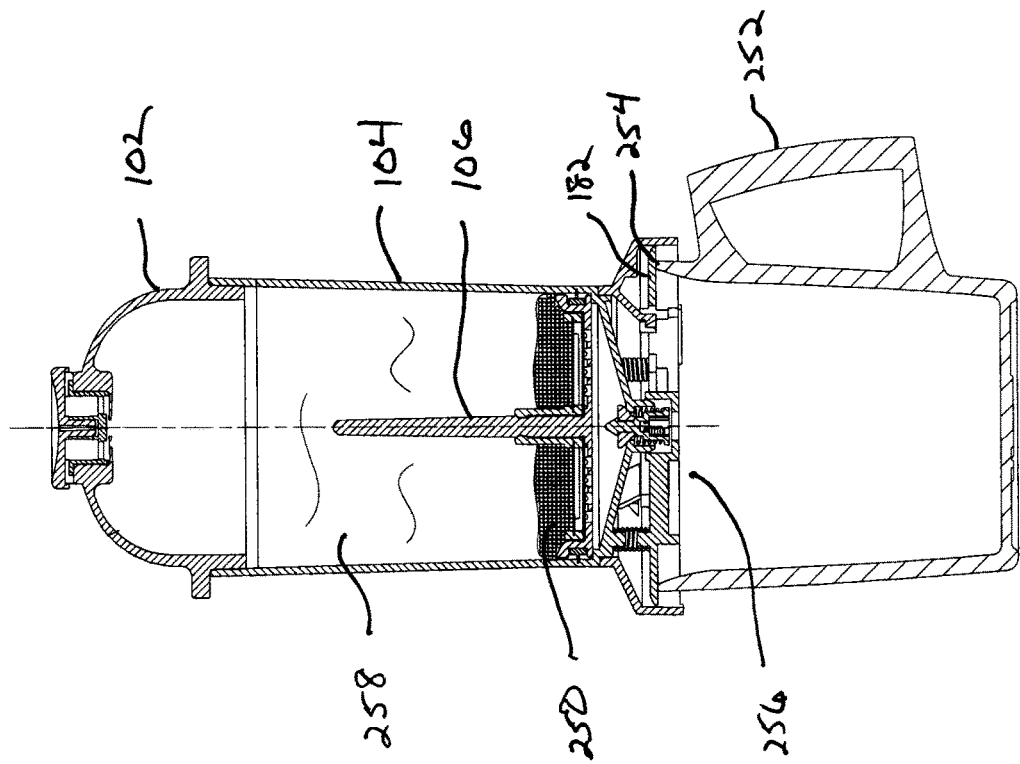

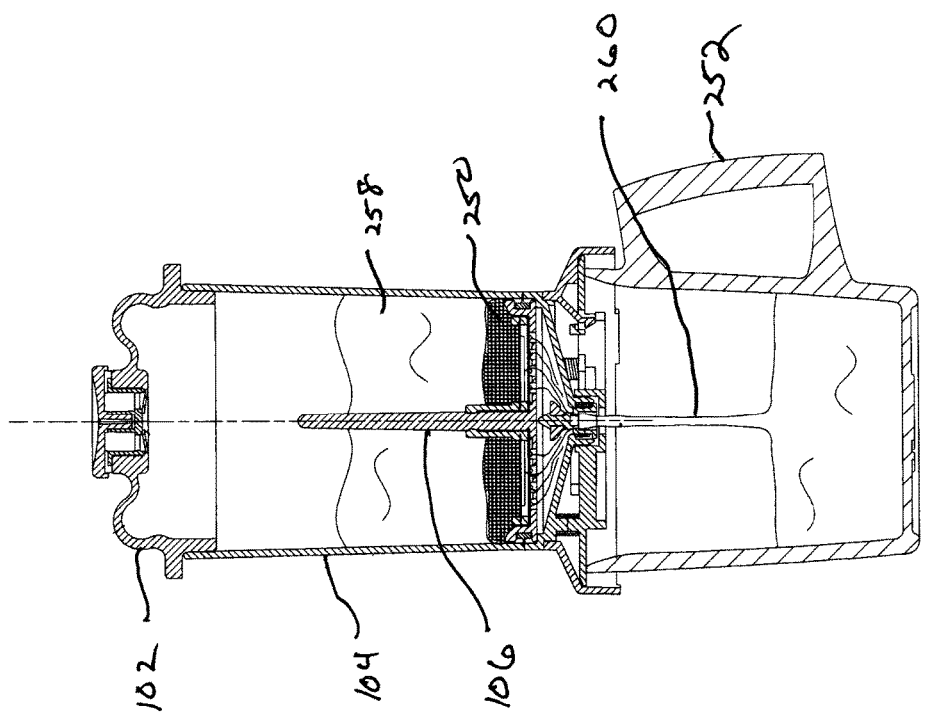

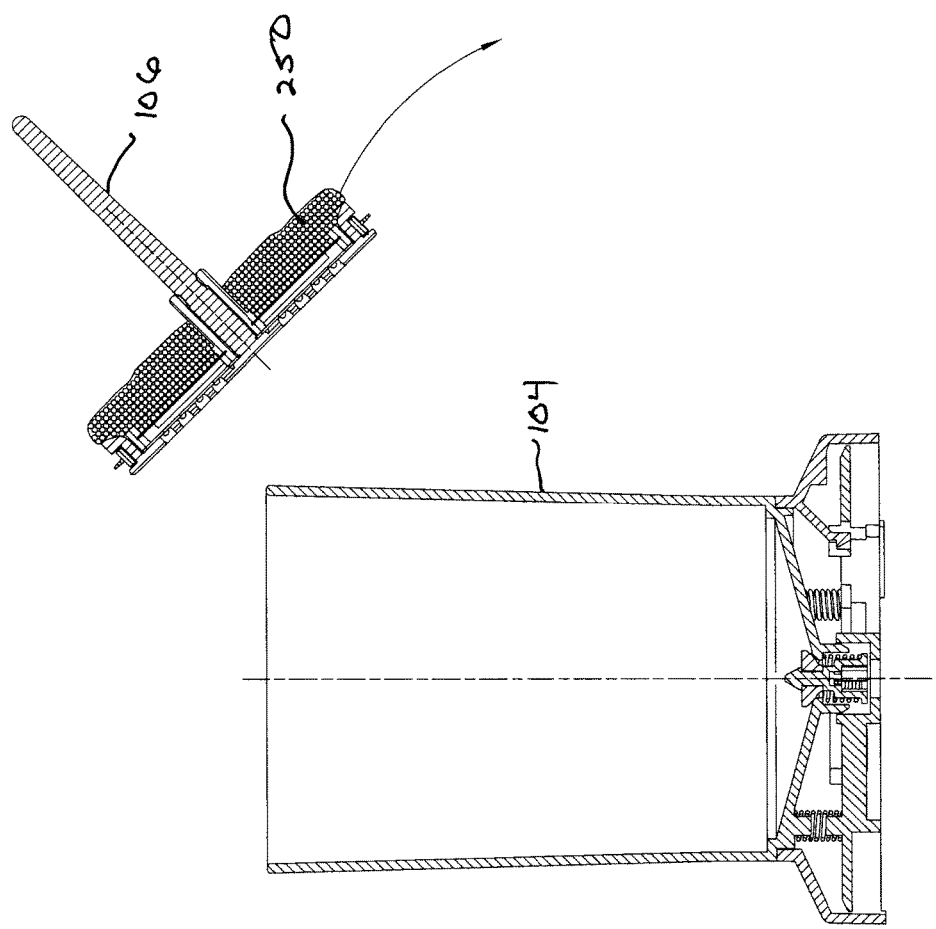

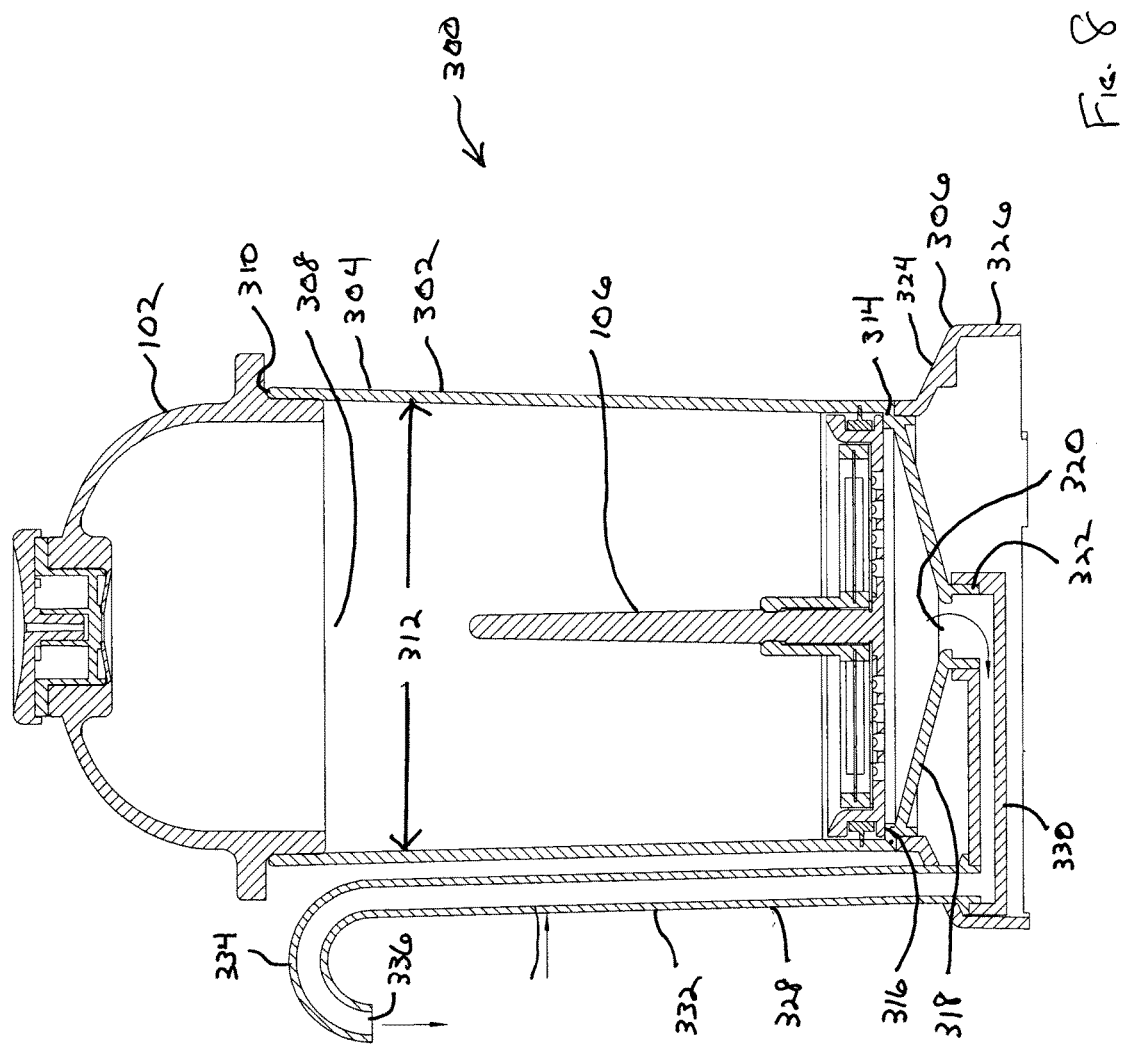

PUMP COFFEE BREWER

FIELD OF THE INVENTION

The present invention is directed to the field of coffee makers and related methods of brewing coffee. More specifically, the present invention is directed to a coffee maker including a brew chamber having a pump assembly and a filter assembly to brew coffee.

BACKGROUND OF THE INVENTION

Coffee is a brewed beverage formed by passing heated water through roasted coffee beans and is one of the most widely consumed beverages in the world. A wide variety of methods and related brewing apparatus exist to brew coffee and are selected by consumers based upon their particular characteristics including ease of brewing, amounts to be brewed and strength/taste of the brewed coffee. When brewing multiple cups or other large volumes, it is common to use equipment utilizing drip or percolating techniques. While percolating or drip style equipment is extremely popular, many coffee aficionados prefer the taste of coffee wherein the servings are individually prepared immediately prior to consumption.

One popular technique for brewing individual servings of coffee is through the utilization of a French Press. The French Press generally consists of a cylindrical chamber into which coffee grounds and heated water are added. A lid is placed over the chamber and a plunger directs a permanent filter downward and through the chamber to physically separate spent coffee grounds from the now freshly brewed coffee. Brewed coffee prepared with a French Press is generally stronger, thicker and includes more sediment than coffee prepared with traditional drip or percolating brewers. It would be advantageous to further improved upon the French press design to provide similar ease of preparation with individual servings while also providing for sediment removal in line with that provided by traditional drip and percolating brew methods.

SUMMARY OF THE INVENTION

Embodiments of the present disclosure relate to a pump coffee brewer for brewing individual servings of coffee. More specifically, representative embodiments of the pump coffee brewer include a pump assembly, brew chamber assembly and filtration assembly, whereby user manipulation of the pump assembly directs heated water through ground coffee to form freshly brewed coffee. In some embodiments, the pump coffee brewer can physically interface with a coffee mug for receiving the freshly brewed coffee while in some alternative embodiments, a discharge assembly can be incorporated for filling the coffee mug. The embodiments of the pump coffee brewer all provide a coffee consumer the ability to generate individual servings of freshly brewed coffee on demand.

In one representative embodiment, a brew chamber assembly can comprise a pump assembly, a brew chamber assembly and a filter assembly. The pump assembly can comprise a deformable exterior wall for manually generating pressure within the brew chamber assembly. The pump assembly can comprise an air flow valve to relieve any vacuum formed within the brew chamber assembly as heated water within the brew chamber assembly begins to cool. The filtration assembly can comprise a filtration disc, a coarse filter and a disposable fine filter allowing freshly brewed coffee to be separated from ground coffee and to allow the ground coffee to be subsequently removed from the brew chamber assembly and discarded. The brew chamber assembly can include a pressure plate for directly engaging an upper surface of a coffee mug so as to provide resistance for preventing a shut off valve from opening until the consumer applies pressure with the pump assembly, thereby directly filling the coffee mug with the freshly brewed coffee.

In another representative embodiment, a brew chamber assembly can comprise a pump assembly, a brew chamber assembly and a filter assembly. The pump assembly can comprise a deformable exterior wall for generating pressure within the brew chamber assembly. The pump assembly can comprise an air flow valve to relieve any vacuum formed within the brew chamber assembly as heated water within the brew chamber assembly begins to cool. The filtration assembly can comprise a filtration disc, a coarse filter and a disposable fine filter allowing freshly brewed coffee to be separated from ground coffee and to allow the ground coffee to be subsequently removed from the brew chamber assembly and discarded. The brew chamber assembly can include a discharge portion for dispensing the freshly brewed coffee to a coffee mug through a discharge spout when the consumer applies pressure with the pump assembly.

In yet another representative embodiment, a method for brewing coffee can comprise placing a filtration assembly within a brew chamber assembly. The method can further comprise placing ground coffee on the filtration assembly and filling the brew chamber assembly with heated water. With the ground coffee and heated water within the brew chamber assembly, the method can further comprise mounting a pump assembly over a chamber opening of the brew chamber assembly. After the ground coffee has steeped within the heated water for a desired amount of time, the method can further comprise applying pressure to the brew chamber assembly with the pump assembly to separate freshly brewed coffee from the coffee grounds. The method can further comprise dispensing the freshly brewed coffee into a coffee mug. In some embodiments, dispensing the freshly brewed coffee can comprise directly dispensing the freshly brewed coffee into the coffee mug or alternatively, utilizing a discharge assembly to dispense the freshly brewed coffee through a discharge spout. The method can further comprise removing the filtration assembly and disposing of the spent ground coffee and the disposable fine filter.

The above summary of the various representative embodiments of the invention is not intended to describe each illustrated embodiment or every implementation of the invention. Rather, the embodiments are chosen and described so that others skilled in the art may appreciate and understand the principles and practices of the invention. The figures in the detailed description that follows more particularly exemplify these embodiments.

BRIEF DESCRIPTION OF THE FIGURES

The invention may be more completely understood in consideration of the following detailed description of various embodiments of the invention in connection with the accompanying drawings, in which:

FIG. 5 is a front, section view of the pump coffee brewer of FIG. 1 attached to a coffee mug with hot water steeping for a preselected time.

FIG. 6 is a front, section view of the pump coffee brewer of FIG. 1 attached to a coffee mug with brewed coffee being manually pumped through a filtration assembly to separate the brewed coffee from spent ground coffee.

FIG. 7 is a front, section view of the brew chamber assembly of FIG. 3 with spent ground coffee being removed from the brew chamber assembly.

FIG. 8 is a front, section view of a pump coffee brewer according to an alternative embodiment of the present invention.

Figure 1:
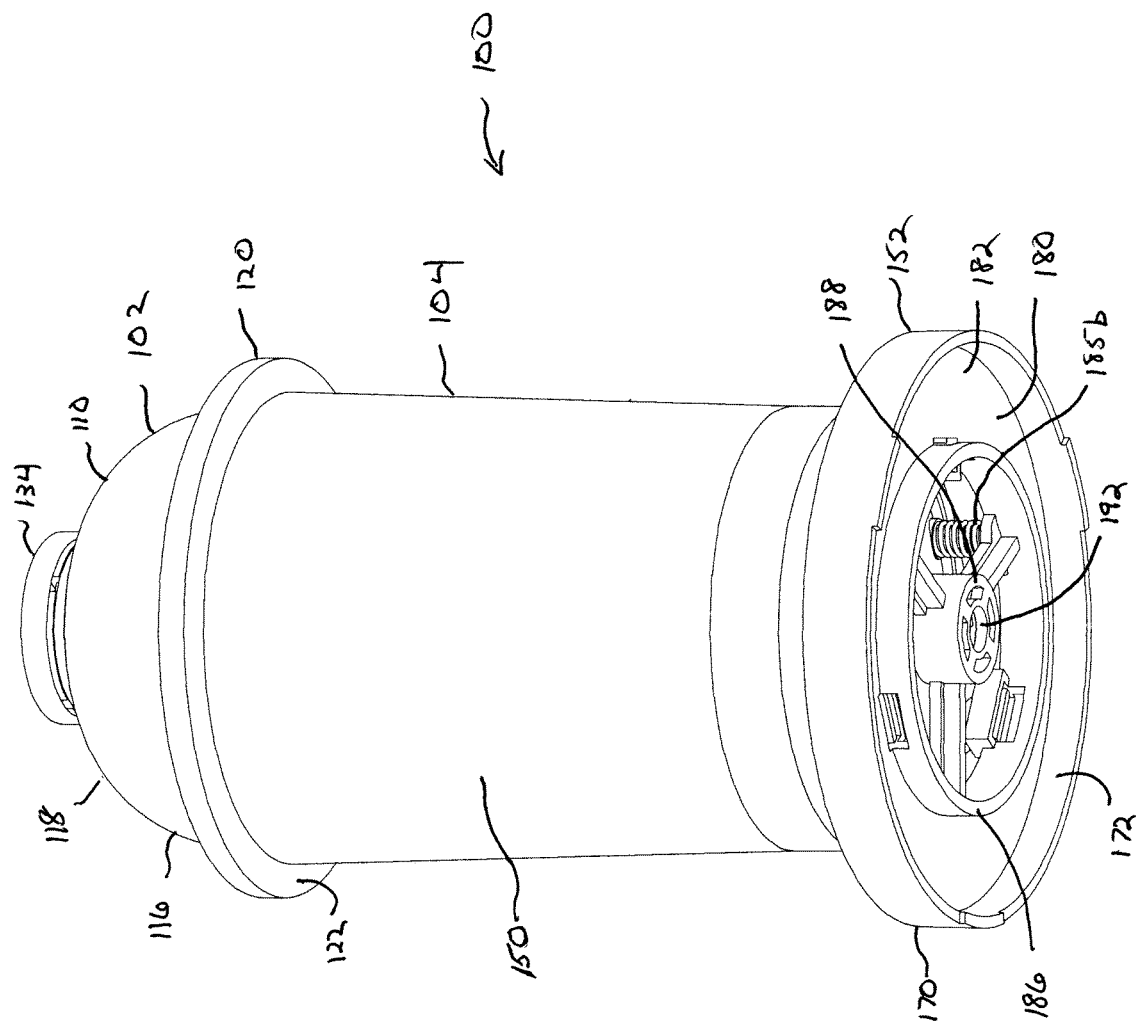
FIG. 1 is a front, lower perspective view of a pump coffee brewer according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

DETAILED DESCRIPTION OF THE FIGURES

Figure 2:
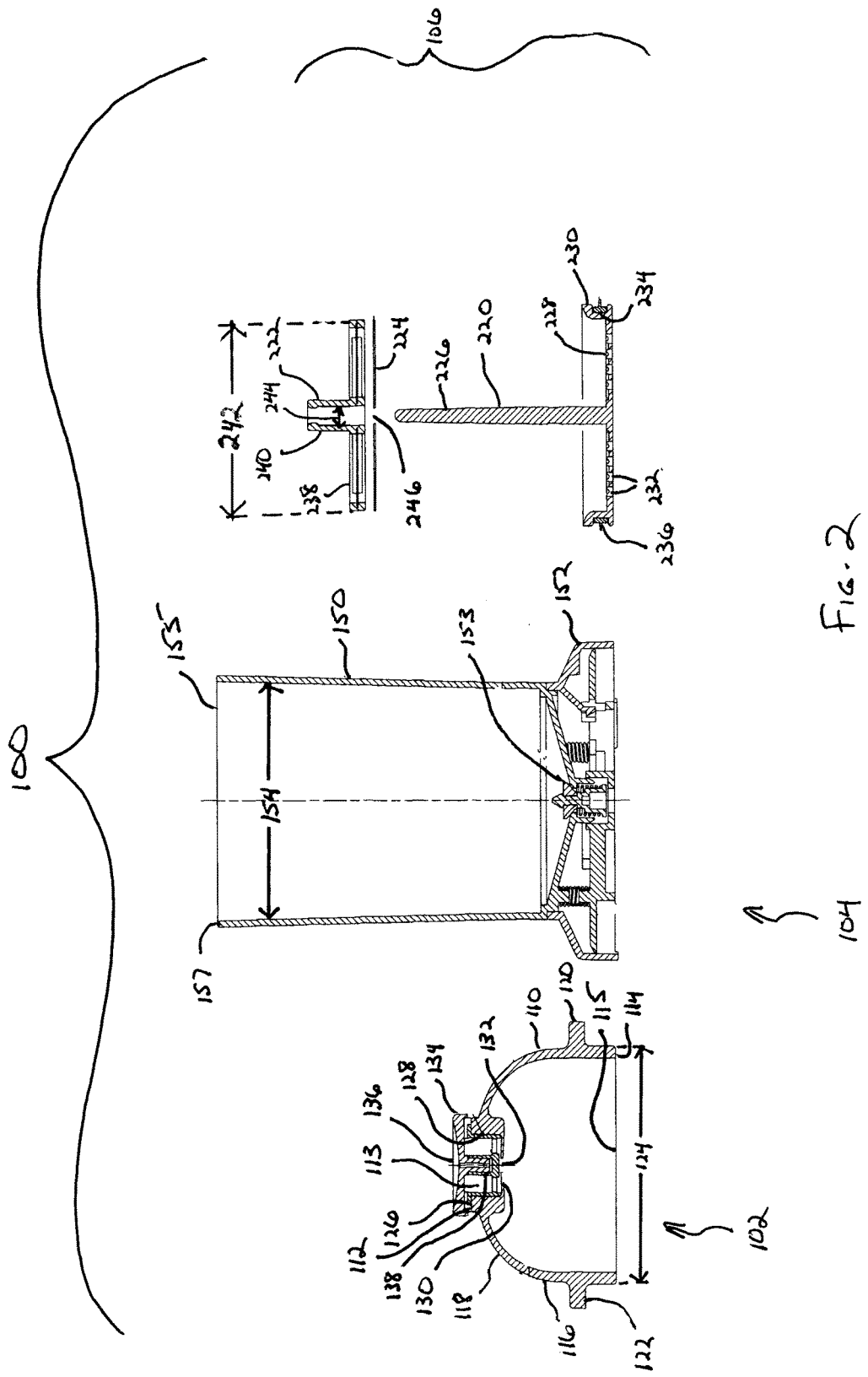
FIG. 2 is a front, exploded, section view of the pump coffee brewer of FIG. 1.

As illustrated in FIGS. 1 and 2, a representative embodiment of a pump coffee brewer 100 can comprise a pump assembly 102, a brew chamber assembly 104 and a filtration assembly 106. Pump coffee brewer 100 is generally fabricated of materials compatible with elevated temperatures associated with brewing hot coffee as well as cleaning and sanitizing following the coffee brewing process. Brew chamber assembly 104 and filtration assembly 106 can comprise materials of construction suitable for food contact and compatible with conventional dishwashing methods such as, for example, plastics such as polycarbonate and polyethylene and/or metals such as stainless steel.

Referring to FIGS. 1 and 2, pump assembly 102 generally comprises an exterior wall 110 having an upper surface 112 defining an upper opening 113 and a lower surface 114 defining a lower opening 115. Exterior wall 110 generally has a spherical perimeter 116 including a domed region 118 defined as the exterior wall 110 transitions into the upper surface 112. Exterior wall 110, and more specifically, domed region 118 is generally formed of a resilient, deformable material such as rubber or other materials suitable for food contact and compatible with conventional dishwashing methods. Proximate the lower surface 114, exterior wall 110 includes a projecting ledge 120 defining a flanged stop surface 122. At lower surface 114, pump assembly 102 has a lower surface diameter 124 measured between outer portions of opposed sides of the exterior wall 110. Upper opening 113 has an upper flanged surface 126, an inner wall 128, and an inner surface 130 that includes a valve opening 132. Pump assembly 102 further includes an air flow valve 134 having an upper stop member 136 and a central projecting member 138. Central projecting member 138 generally is sized to have a diameter larger than the valve opening 132.

Figure 3:
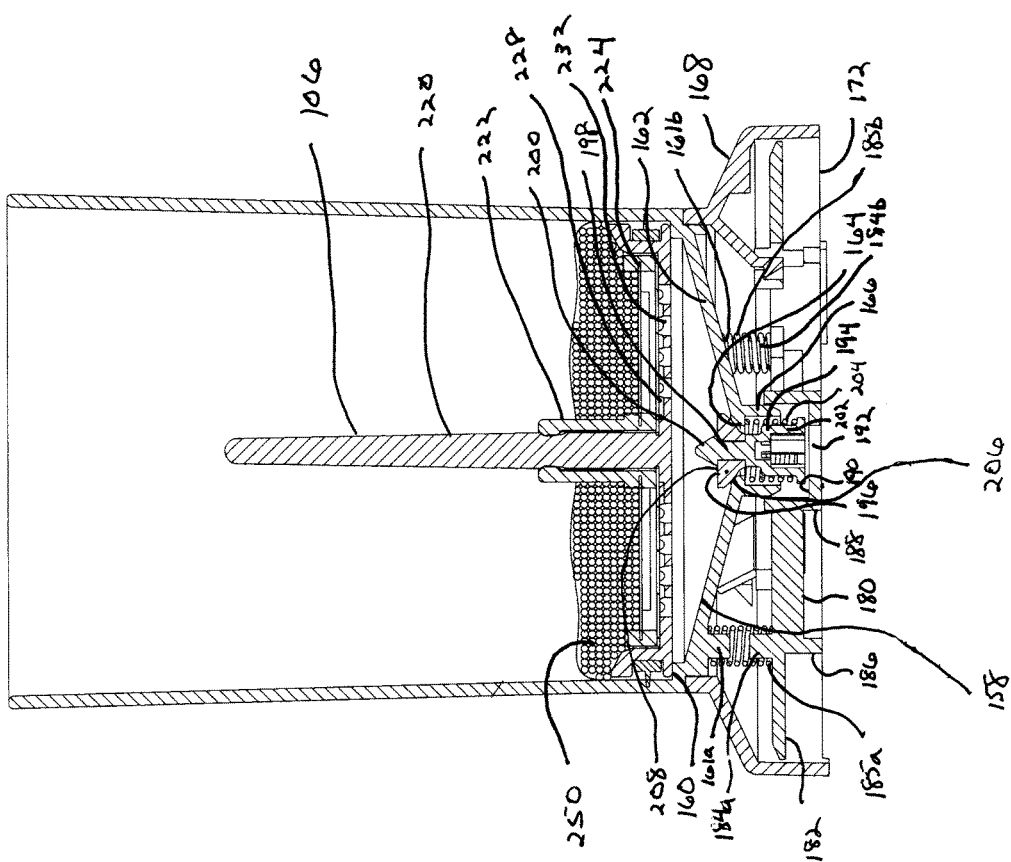
FIG. 3 is a front, section view of a brew chamber assembly with ground coffee added to the brew chamber assembly.

Referring to FIGS. 1, 2 and 3, brew chamber assembly 104 generally comprises a cylindrical body portion 150, an interface portion 152 and a shut off valve 153. Cylindrical body portion 150 defines a chamber opening 155 defined at a top body surface 157 and includes an inner diameter 154 that is only slightly larger than the lower surface diameter 124. Cylindrical body portion 150 includes a lower engagement surface 158 having an internal perimeter flange 160, three lower mounting posts, two of three shown as 161a and 161b, and a tapered lower surface 162. Tapered lower surface 162 defines a lower valve opening 164 and a projecting wall 166. Interface portion 152 attaches to the cylindrical body portion 150 and includes a transition portion 168 and a perimeter wall 170 that defines an engagement opening 172. Brew chamber assembly 104 further comprises a pressure plate 180 positioned within the engagement opening 172. Pressure plate 180 includes an end surface 182, three upper mounting posts, two of three shown as 184a and 184b, a lower divider wall 186, a plate wall 188 and a plate flanged surface 190 defining a central opening 192. Three plate springs, two of three shown as 185a and 185b are mounted over the upper mounting posts, 184a and 184b and lower mounting posts, 161a and 161b. Shut off valve 153 includes a valve member 194 and a sealing member 196. Valve member 194 includes a valve stem 198 having a valve projection 200 and an actuation body 202. A valve spring 204 mounts around the actuation body 202. Sealing member 196 generally comprises a compliant sealing material defining a tapered sealing surface 206 and a retention surface 208. Tapered sealing surface 206 has a diameter exceeding the diameter of the lower valve opening 164. Sealing member 196 generally mounts over valve projection 200 and is retained on the valve stem 198.

As illustrated in FIGS. 2 and 3, filtration assembly 106 generally comprises a filtration disk 220, a coarse filter 222 and a fine filter 224. Filtration disc 220 includes a central mounting post 226, a disk floor surface 228 and a perimeter wall 230. Disk floor surface 228 includes a plurality of apertures 232 extending through the disk floor surface 228. Perimeter wall 230 includes an external sealing channel 234 for accommodating a filtration gasket 236. Coarse filter 222 includes a coarse filter surface 238 and a hollow projection 240. Coarse filter surface 238 has a coarse filter diameter 242 that accommodates the positioning of the coarse filter surface 238 within perimeter wall 230. Hollow projection 240 has an internal diameter 244 allowing the coarse filter 222 to be positioned over the central mounting post 226. Fine filter 224 generally comprises a disposable filter with a generally flat profile having a fine filter diameter equivalent to the coarse filter diameter 242 and a fine filter aperture 246.

To assemble pump coffee brewer 100, fine filter 224 is first positioned such that fine filter aperture 246 slides over the central mounting post 226 as shown in FIGS. 2 and 3. Fine filter 224 is advanced down the central mounting post 226 until the fine filter 224 rests upon the disc floor surface 228. Next, the coarse filter 222 is positioned such that the hollow projection 240 can be placed over the central mounting post 226. The coarse filter 222 is advanced down the central mounting post 226 until the coarse filter surface 238 rests upon the fine filter 224.

Once filtration assembly 106 is assembled, the filtration assembly 106 is positioned within the cylindrical body portion 150 as illustrated in FIG. 3. Filtration disc 220 is advanced into the chamber opening 155 until disc floor surface 228 is in contact with and rests against the internal perimeter flange 160. Perimeter wall 230 is only slightly undersized with respect to the inner diameter 154 such that filtration gasket 236 forms a liquid tight seal between the filtration assembly 106 and the cylindrical body portion 150.

Once the filtration assembly 106 is installed within the cylindrical body portion 150, the pump assembly 102 is attached to the cylindrical body portion 150 as shown in FIG. 5. Pump assembly 102 is oriented such that the lower surface 114 is inserted into the cylindrical body portion 150 until the flanged stop surface 122 contacts the cylindrical body portion 150 and prevents further insertion of the lower surface 114.

Figure 4:
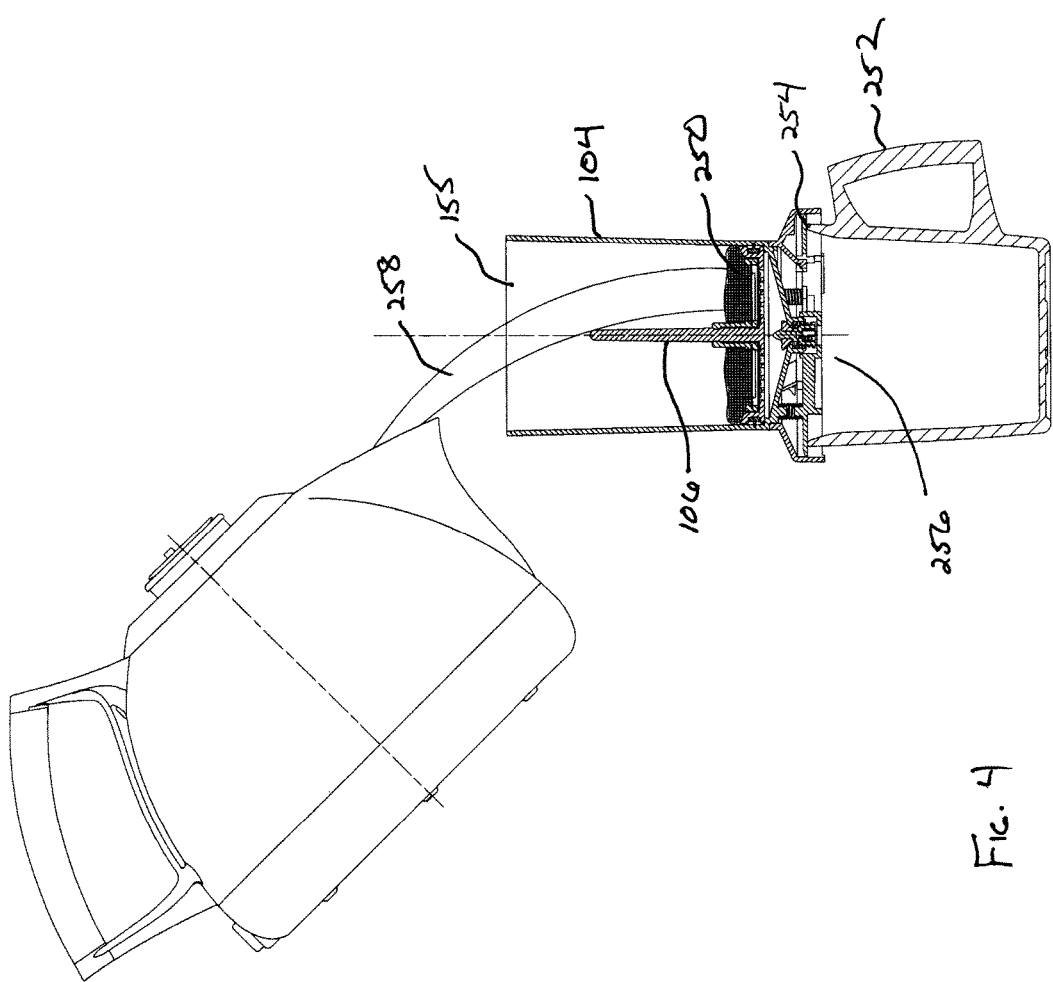
FIG. 4 is a front, section view of a brew chamber assembly attached to a coffee mug with hot water being added to the brew chamber assembly.

In use, the filtration assembly 106 is positioned with the brew chamber assembly 104 such that ground coffee 250 can be added through the chamber opening 155 as illustrated in FIG. 3. The seal created between the filtration gasket 236 and the cylindrical body portion 150 prevents any of the ground coffee 250 from bypassing the filtration assembly 106 and reaching the tapered lower surface 162. With the ground coffee 250 in the brew chamber assembly 104, the brew chamber assembly 104 can be positioned over a coffee mug 252 as shown in FIG. 4. An upper mug surface 254 is in direct contact with the end surface 182 such that central opening 192 is positioned in a mug opening 256. Next, hot water 258 that has been preheated to a desired temperature is poured directly into the chamber opening 155 such that the hot water 258 can begin steeping the ground coffee 250. Once the hot water 258 has been added, the pump assembly 102 is attached to the brew chamber assembly 104 by inserting the lower surface 114 into the chamber opening 155 as shown in FIG. 5. Lower surface 114 is fully inserted into chamber opening 155 until flanged stop surface 122 engages top body surface 157. Pressure plate 180 is held in a downward position as the combined weight of the pump assembly 102, brew chamber assembly 104, filtration assembly 106, ground coffee 250 and hot water 258 is insufficient to overcome the spring forces of the three plate springs, two of three shown as 185a and 185b. With the pressure plate 180 in the downward position, shut off valve 153 remains closed as no pressure is applied to the valve spring 204.

With the pump assembly 102 attached to the brew chamber assembly 104, ground coffee 250 steeps within the hot water 258 for a desired amount of time. By fully enclosing the hot water 258 within the brew chamber assembly 104, heat loss from the hot water 258 to the ambient atmosphere is minimized. As the hot water 258 begins to cool, a slight vacuum condition forms above hot water 258. As this vacuum condition is formed, inner surface 130 is deflected inwardly toward the hot water 258 to vent the pump assembly 102 to the ambient atmosphere and neutralize this vacuum condition.

Once the ground coffee 250 has steeped in hot water 258 for the desired time period, a user applies pressure in a downward direction against the exterior surface 110 and upper surface 112 of the pump assembly 102 as illustrated in FIG. 6. The downward pressure causes the domed region 118 to deform inwardly, thereby applying downward pressure against the hot water 258. The downward pressure applied by the user is also sufficient to overcome the spring forces of the three plate springs, two of three shown as 185a and 185b such that the pressure plate 180 moves in an upward direction relative to the transition portion 168 such that end surface 182 is directed into engagement with the transition portion 168. As the pressure plate 180 moves upwardly, valve spring 204 is compressed resulting in the sealing member 196 being lifted from the lower valve opening 164 so as to allow flow through the central opening 192 and into the coffee mug 252. With a flow channel open to the coffee mug 252, hot water 258 is directed through the ground coffee 250. The ground coffee 250 is retained by the combination of the coarse filter 222 and fine filter 224. Freshly brewed coffee 260 passes through the coarse filter 222, fine filter 224 and apertures 232 whereby the freshly brewed coffee 260 flows through the lower valve opening 164, through the central opening 192 and into the coffee mug 252.

Once the freshly brewed coffee 260 has been collected, the pump coffee brewer 100 can be lifted off of the coffee mug 252. As the engagement of pressure plate 180 and the upper mug surface 254 is terminated, the three plate springs, two of three shown as 185a and 185b return to their noncompressed state such that the pressure plate 180 is moved to the downward position relative to the transition portion 168. With the pressure plate 180 in the downward position, valve spring 204 returns to its noncompressed state such that sealing member 196 engages and closes off the lower valve opening 164. The user then grasps pump assembly 102 and pulls the lower surface 114 out of the chamber opening 155. Once chamber opening 155 is exposed, the user grasps the central mounting post 226 and pulls the filtration assembly 106 out of the brew chamber assembly 104 as shown in FIG. 7. With the filtration assembly 106 removed from the brew chamber assembly 104, the coarse filter 222 and fine filter 224 can be removed from about central mounting post 226 such that the now spent ground coffee 250 as well as fine filter 224 can be discarded. With pressure removed from the pump assembly 102, the domed region 118 of pump assembly 102 returns to its pre-pressurized state such that the only requirement for further utilization of the pump coffee brewer 100 is replacement of the fine filter 224.

In an alternative embodiment as illustrated in FIG. 8, a pump coffee brewer 300 can be configured for placement and use directly on a generally flat, hard surface such as a countertop or table. Pump coffee brewer 300 can utilize the same pump assembly 102 and filtration assembly 106 as pump coffee brewer 100 with a design difference being found within a brew chamber assembly 302.

Brew chamber assembly 302 generally comprises a cylindrical body portion 304 and discharge portion 306. Cylindrical body portion 304 defines a chamber opening 308 at a top body surface 310 and includes an inner diameter 312 that is only slightly larger than the lower surface diameter 124. Cylindrical body portion 304 includes a lower engagement surface 314 having an internal perimeter flange 316 and a tapered lower surface 318. Tapered lower surface 318 defines a discharge opening 320 and a projecting wall 322. Discharge portion 306 attaches to the cylindrical body portion 304 and includes a transition portion 324, a perimeter wall 326 and a discharge assembly 328. Discharge assembly 328 includes a discharge tube 330 that is operably coupled to the discharge opening 320 and a discharge spout 332 that extends through the transition portion 324 and projects upwardly in generally parallel relation to the cylindrical body portion 304. Discharge spout 332 includes an uppermost bend region 334 and a spout opening 336. Discharge spout 332 extends upward along the cylindrical body portion 304 such that uppermost bend region 334 is generally located at the same elevation relative to a supporting flat surface (countertop or table) as the top body surface 310. In this manner, sufficient head pressure does not exist within the brew chamber assembly 302 to allow hot water 258 to be prematurely or accidentally directed through the discharge assembly 328 and out the spout opening 336.

The initial operation of pump coffee brewer 300 is substantially similar as that previously described with respect to pump coffee brewer 100. The assembly and attachment of filtration assembly 106, the addition of ground coffee 250 and hot water pump assembly 102 and the attachment and operation of pump assembly 102 are essentially identical to that previously described with respect to pump coffee brewer 100. Once the ground coffee 250 has steeped in hot water 258 for the desired time period, a user applies pressure in a downward direction against the exterior surface 110 and upper surface 112 of the pump assembly 102. The downward pressure causes the domed region 118 to deform inwardly as shown in FIG. 6, thereby applying downward pressure against the hot water 258. This downward pressure is sufficient to force hot water 258 through the ground coffee 250, through the coarse filter 222, through the fine filter 224 and finally through the apertures 232 such that freshly brewed coffee 260 is directed out the discharge opening 320 and into the discharge tube 330. The pressure applied by pump assembly 102 provides enough force to direct the freshly brewed coffee 260 up the discharge spout 332, past the uppermost bend region 334 and out the spout opening 336 where the freshly brewed coffee 260 can be directed into coffee mug 252.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents.

The invention claimed is:

1. A coffee brewer, comprising:
a pump assembly having a deformable exterior wall;
a brew chamber assembly adapted to receive ground coffee and heated water, the brew chamber assembly including a pressure plate, a plurality of plate springs, and an opening having a shut off valve, said shut off valve having an actuation body, the shut off valve further including a valve spring and a sealing member, said valve spring mounted around the actuation body; and
a filtration assembly mounted within the brew chamber assembly,
wherein application of downward pressure to said deformable exterior wall generates sufficient pressure on said plate springs within said brew chamber assembly such that said pressure plate is directed upwards and said valve spring is thereby compressed such that said sealing member is lifted away from said opening so as to allow said heated water to be directed through ground coffee, and wherein the filtration assembly retains the ground coffee such that brewed coffee passes through said filtration assembly, though said opening and into a mug,
and wherein said plate springs and said pressure plate return to an uncompressed state when the previously sufficient downward pressure is removed such that said valve spring also returns to an uncompressed state and said sealing member thereby lowers and engages with said opening to block said opening, such that any flow between the brew chamber and the mug only occurs when the downward pressure is applied to the deformable exterior wall.

2. The coffee brewer of claim 1, wherein the filtration assembly comprises a coarse filter and fine filter.

3. The coffee brewer of claim 2, wherein the fine filter comprises a disposable fine filter.

4. The coffee brewer of claim 1, wherein the pump assembly includes an air valve mounted in said deformable exterior wall, said air valve opening in response to a vacuum condition within the brew chamber assembly such that the brew chamber assembly is vented to atmosphere.

5. The coffee brewer of claim 1, wherein the brew chamber assembly includes an interface portion having a perimeter wall defining an engagement opening, said engagement opening accommodating an upper mug surface of a coffee mug.

6. The coffee brewer of claim 5, wherein the interface portion includes the pressure plate within the engagement opening, the pressure plate defining the lower valve opening, wherein the brewed coffee flows into the coffee mug through the lower valve opening.

7. A coffee brewer, comprising:
means for receiving heated water and ground coffee; and
means for manually applying downward pressure to the heated water such that a means for separating can retain the ground coffee,
wherein the means for receiving heated water and coffee includes a pressure plate, a plurality of plate springs, a central opening having a shut off valve including an actuation body, the shut off valve further including a valve spring and a sealing member with said valve spring mounted around the actuation body, the shut off valve being opened relative to a central opening in response to the means for manually applying downward pressure generating sufficient pressure on the plurality of plate springs such that the pressure plate is directed upwards, the valve spring is compressed and the sealing member is thereby lifted from the central opening, and wherein the shut off valve only allows for flow from the means for receiving to the coffee mug, and only when sufficient downward pressure is applied on the plurality of plate springs by the means for manually applying downward pressure.

8. The coffee brewer of claim 7, wherein the means for retaining comprises a brew chamber assembly.

9. The coffee brewer of claim 8, wherein the means for manually applying downward pressure comprises a manual pump assembly attached to the brew chamber assembly.

10. The coffee brewer of claim 9, wherein the means for separating comprises a filter assembly having a permanent coarse filter and a disposable fine filter.

* * * * *